(12) United States Patent
Dickens

(10) Patent No.: US 10,427,558 B1
(45) Date of Patent: Oct. 1, 2019

(54) SAFETY SEAT FOR USE IN VEHICLES AND CONVERTIBLE AS A PUSHCHAIR

(71) Applicant: Clifford Gregory Dickens, The Villages, FL (US)

(72) Inventor: Clifford Gregory Dickens, The Villages, FL (US)

( * ) Notice: Subject to any disclaimer, the term of this patent is extended or adjusted under 35 U.S.C. 154(b) by 0 days.

(21) Appl. No.: 15/976,126

(22) Filed: May 10, 2018

(51) Int. Cl.
    *B60N 2/00*     (2006.01)
    *B60N 2/28*     (2006.01)
    *B62B 7/00*     (2006.01)
    *B62B 7/12*     (2006.01)
    *B62B 9/20*     (2006.01)
    *B62B 7/10*     (2006.01)

(52) U.S. Cl.
CPC ......... *B60N 2/2848* (2013.01); *B60N 2/2821* (2013.01); *B62B 7/006* (2013.01); *B62B 7/10* (2013.01); *B62B 7/12* (2013.01); *B62B 9/20* (2013.01); *B62B 2205/12* (2013.01)

(58) Field of Classification Search
CPC ........... B62B 5/0093; B62B 7/12; B62B 9/20; B60N 2/2848; B60N 2/2845; B60N 2/2806
See application file for complete search history.

(56) References Cited

U.S. PATENT DOCUMENTS

| | | | | |
|---|---|---|---|---|
| 3,290,050 A * | 12/1966 | Ezquerra | ................... | B62B 7/12 280/30 |
| 4,989,888 A * | 2/1991 | Qureshi | ............... | B60N 2/2848 280/30 |
| 5,149,113 A * | 9/1992 | Alldredge | ................. | B62B 7/12 280/30 |
| 5,230,523 A * | 7/1993 | Wilhelm | ................... | B62B 7/12 280/30 |
| 5,403,022 A * | 4/1995 | Snider | .................. | B60N 2/2848 280/30 |
| 5,823,547 A * | 10/1998 | Otobe | .................. | B60N 2/2839 280/30 |
| 6,296,259 B1 | 10/2001 | Anderson | | |
| 6,655,702 B2 * | 12/2003 | Senger | ............... | B60N 2/01541 280/30 |
| 6,729,630 B2 * | 5/2004 | Szmidt | ................. | B60N 2/2806 280/47.25 |

(Continued)

FOREIGN PATENT DOCUMENTS

FR               953381          12/1949

*Primary Examiner* — Hau V Phan
(74) *Attorney, Agent, or Firm* — Sanchelima & Associates, P.A.; Christian Sanchelima; Jesus Sanchelima

(57) ABSTRACT

The present invention discloses a safety seat that is used in vehicles and convertible as a pushchair and mainly includes safety seat, housing, converter mechanism, at least one front wheel, at least one rear wheel, a telescopic handle and a plurality of light sources. Safety seat enables user to safely seat thereon. Housing accommodates safety seat thereon. Housing also houses front wheels and rear wheels while in folded configuration and supports front wheels and rear wheels in un-folded configuration. Housing has a front wall that can be used as a leg support. Converter mechanism easily converts safety seat in a first configuration for use in a vehicle and a second configuration for use as a pushchair. Telescopic handle, when extended, helps pushing pushchair and when retracted can be used as safety seat. Light source illuminates the area in surrounding safety seat.

12 Claims, 4 Drawing Sheets

(56) References Cited

U.S. PATENT DOCUMENTS

| | | | | |
|---|---|---|---|---|
| 6,976,685 B1* | 12/2005 | King | ................... | B60N 2/2806 280/30 |
| 7,540,507 B1* | 6/2009 | Kennedy | .............. | B60N 2/2821 280/30 |
| 8,544,941 B2* | 10/2013 | Coote | ................. | B60N 2/2845 297/118 |
| 9,254,857 B2* | 2/2016 | Fiebelkorn | ............ | B62B 5/0093 |
| 9,260,039 B1* | 2/2016 | Satterfield | ............ | B60N 2/2848 |

* cited by examiner

SAFETY SEAT FOR USE IN VEHICLES AND CONVERTIBLE AS A PUSHCHAIR

BACKGROUND OF THE INVENTION

1. Field of the Invention

The present invention relates to a safety seat for use while commuting, more particularly, to a safety seat for providing safe commutation of users like infants, child or pets when attached to a vehicle and convertible as a pushchair while pedestrian walk.

2. Description of the Related Art

Commuting with dependant users like infants, child or pets is a tedious task especially when the travel involves both a vehicular travel and a pedestrian travel such as walk, brisk walk or running. A vehicle safety seat is available that can be attached to a car seat or connected to bicycles. However, when the destination is reached user needs to be lifted and carried in hands or kept in a pushchair (also known as a stroller) which is required to be additionally carried in vehicle along with vehicle safety seat. Pushchair occupies space in vehicle and increases weight. More cost is involved in separately purchasing vehicle safety seat and pushchair. Also, handling pushchair each time is tedious activity because of number of operations involved such as folding, keeping in vehicle, removing from vehicle and un-folding and lifting and tying belts around infant, child or pet.

Several designs of various vehicle safety seat and pushchair have been designed in the past. None of them, however, include a multi-utility seat that can be easily converted to a vehicle safety seat and pushchair and vice-versa.

Applicant believes that a related reference corresponds to U.S. Pat. No. 6,296,259 issued to Dreams & Visions Of Inspirations, Inc. titled "Child safety seat stroller" discloses an integral carry-on child safety seat and stroller having housing capable to house seat thereon and receive wheels thereunder when desired to be used as a seat and extend the wheels from housing to form a stroller. However, child safety seat stroller is big in size and bulky as housing needs to accommodate seat and wheels without being folded. Also, as all wheels are extended or retracted simultaneously, a jerk can be experienced when stroller changes configuration to form seat. Another approach provided in French Pat. No. 953,381 issued to Leroy illustrates a convertible child's stroller to high chair arrangement involving a complex matrix of interrelating linkages to perform this function. While of interest in a convertible child seat enabling multiple functions, the bulkiness and awkwardness of the device as well as its non-operability to automotive environments limits its relevance to the instant invention.

Other documents describing the closest subject matter provide for a number of more or less complicated features that fail to solve the problem in an efficient and economical way. None of these patents suggest the novel features of the present invention.

SUMMARY OF THE INVENTION

In view of the above, it is an objective of the present invention to solve or at least reduce the problems discussed above. The present invention is a safety seat for use in vehicles and convertible as a pushchair and mainly includes safety seat, housing, converter mechanism, at least one front wheel, at least one rear wheel, a telescopic handle and a plurality of light sources. Safety seat enables user to safely seat thereon and has at least one seat belt to secure user and prevent from falling. Housing accommodates safety seat thereon. Housing also houses front wheels and rear wheels while in folded configuration and supports front wheels and rear wheels in un-folded configuration. Housing has a front wall that can be extended for use as a leg support and retracted to form an enclosed housing for supporting safety seat for use in vehicles. Converter mechanism easily converts safety seat in a first configuration for use in a vehicle and a second configuration for use as a pushchair. Telescopic handle is provided which when extended helps pushing pushchair for its movement and when retracted can be used as safety seat. Light source illuminates the area in surrounding safety seat.

It is one of the main objects of the present invention to provide a safety seat that is readily and efficiently converted from use as a safety seat of vehicle to a pushchair for permitting users like infant, child or pet to be moved on ground.

It is another object of this invention to provide a multi-utility and easy to carry and use a safety seat in a vehicle and on ground while in pedestrian motion.

It is another object of this invention to provide a safety seat for use in vehicles and convertible as a pushchair that is cost efficient, durable and reliable.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
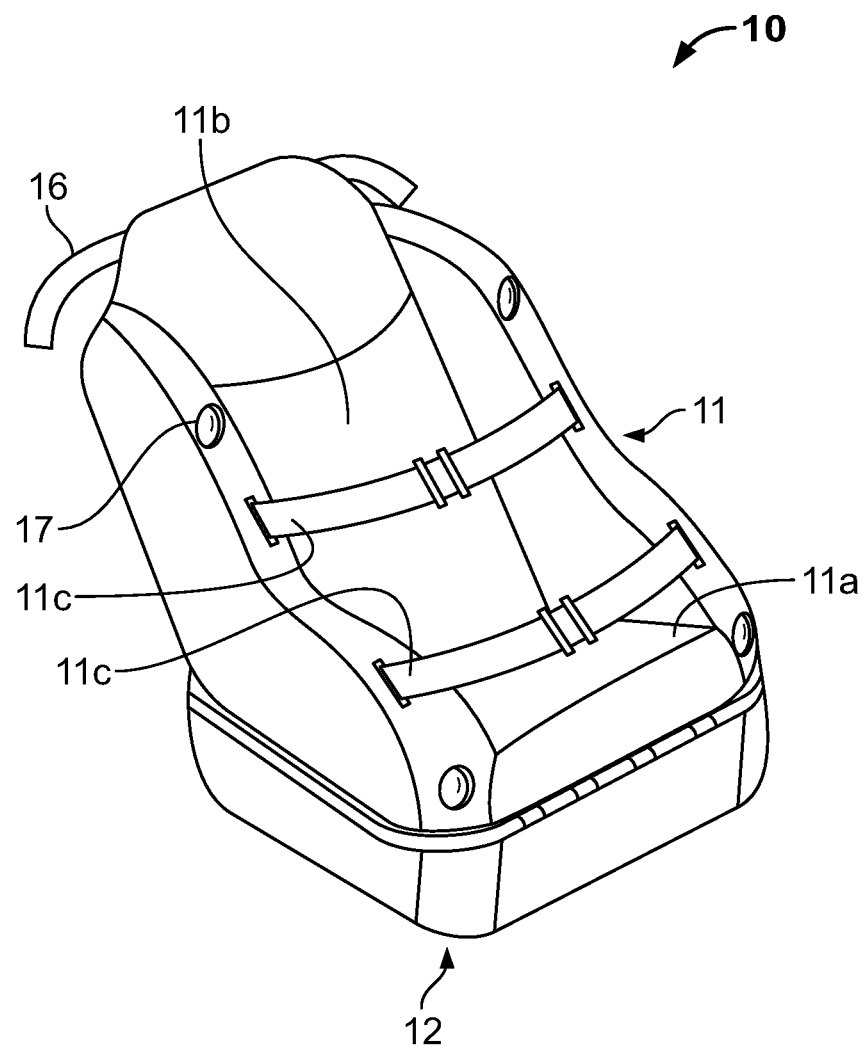
FIG. 1 represents a perspective view of a safety seat, in accordance with one embodiment of the present invention, wherein safety seat is in a retracted configuration and ready to be positioned in vehicle.

Referring now to the drawings (FIGS. 1 to 6), where the present invention is generally referred to with numeral 10, it can be observed that a safety seat for use in vehicles and convertible as a pushchair includes a safety seat 11, housing 12, a converter mechanism, at least one front wheel 14a, 14b, at least one rear wheel 15a, 15b, a telescopic handle 16 and a plurality of light sources 17.

Safety seat 11 has a seat portion 11a and a back rest 11b. Seat portion 11a when substantially in up-right position provides users like infant, child or pet a comfortably sit. In one embodiment, back rest 11b can be movable from an upright configuration to a sleeping configuration that enables users to rest in a substantially sleeping position. In another embodiment, back rest 11b is immovable or fix with respect to seat portion 11b. Safety seat 11 has at least one seat belt 11c that is wrapped around user such as infant, child or pet so as to prevent them from falling thus providing secured and safe seat.

Figure 2:
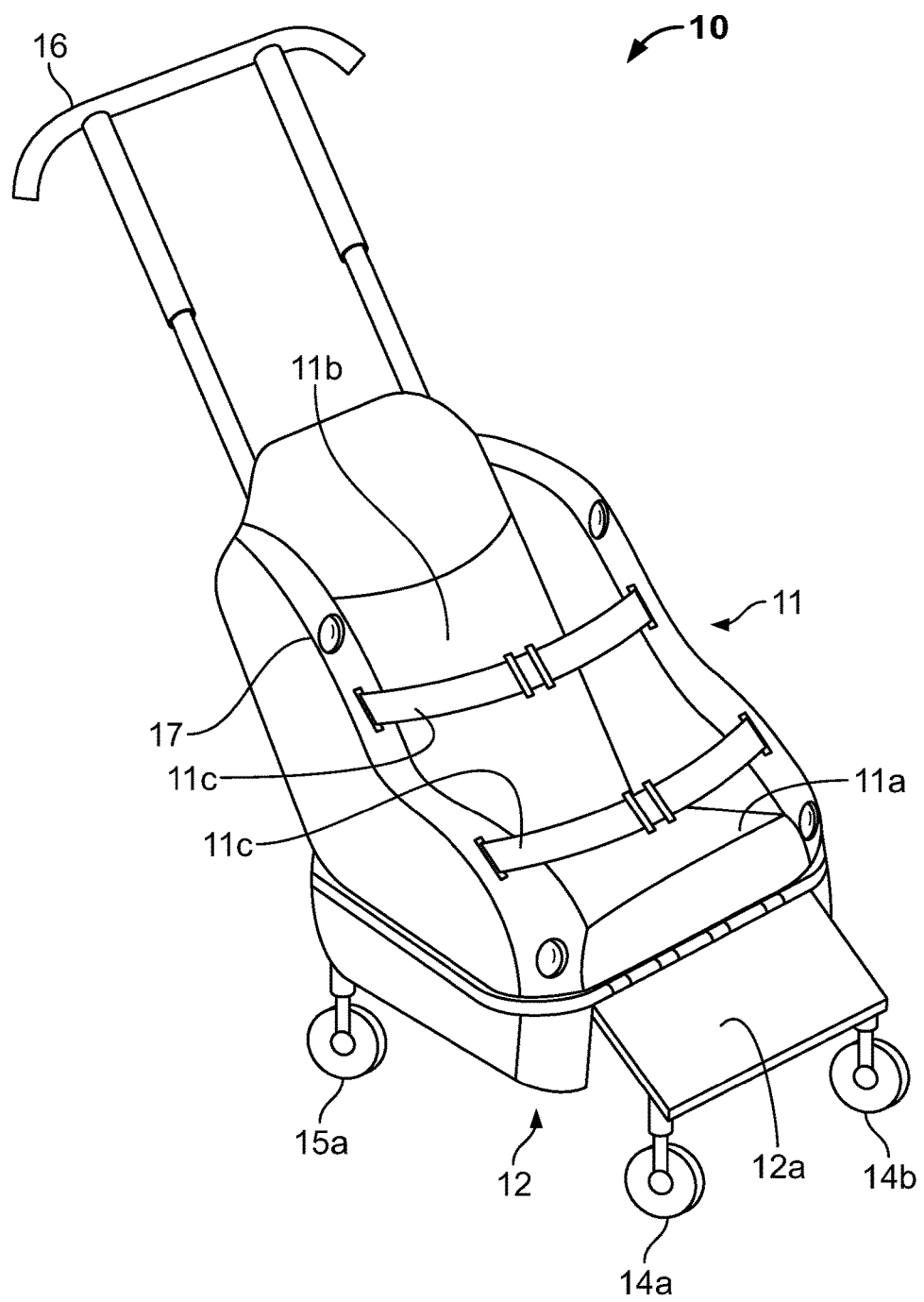
FIG. 2 shows a perspective view of a safety seat of FIG. 1 converted to an extended configuration to form a pushchair.
Figure 3:
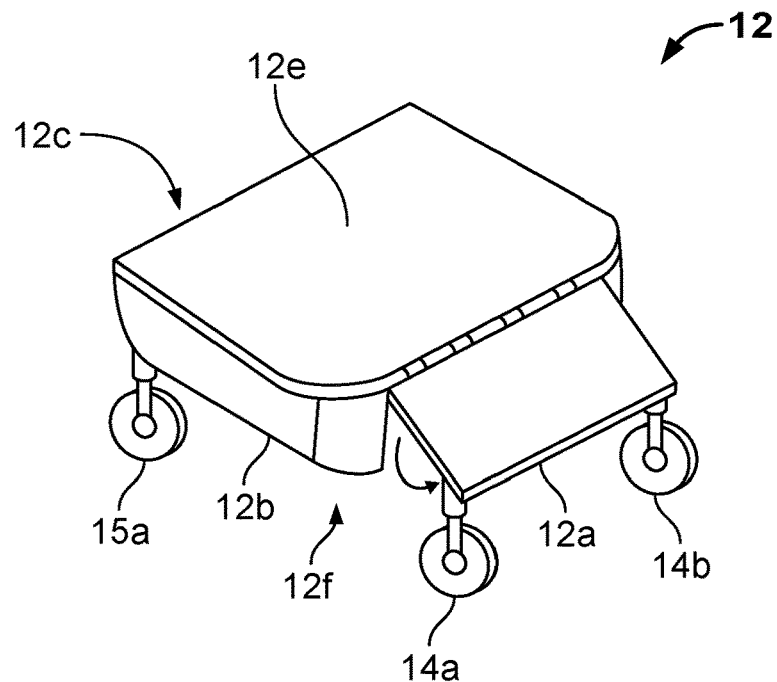
FIG. 3 illustrates a perspective view of housing of safety seat of FIG. 1, wherein front and rear wheels are in extended configuration.
Figure 4:
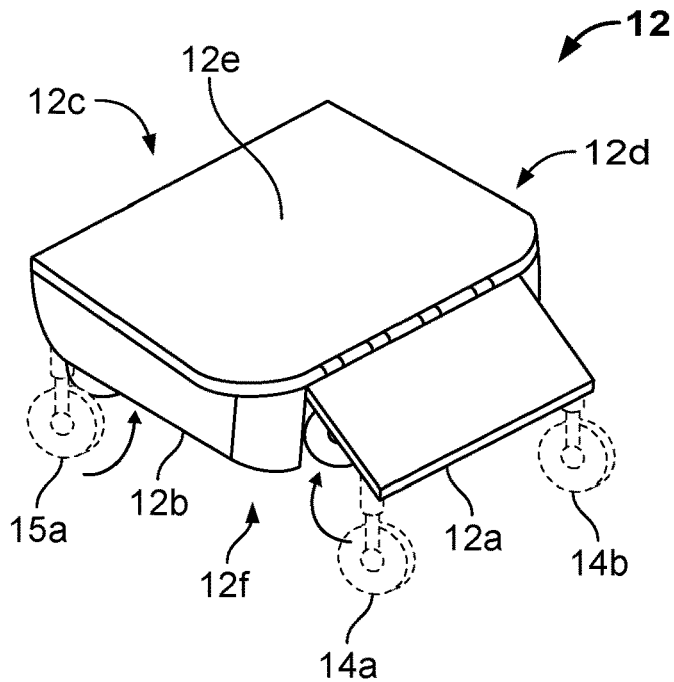
FIG. 4 illustrates a perspective view of housing FIG. 3, wherein front and rear wheels are partially being converted from extended configuration to retracted configuration.
Figure 5:
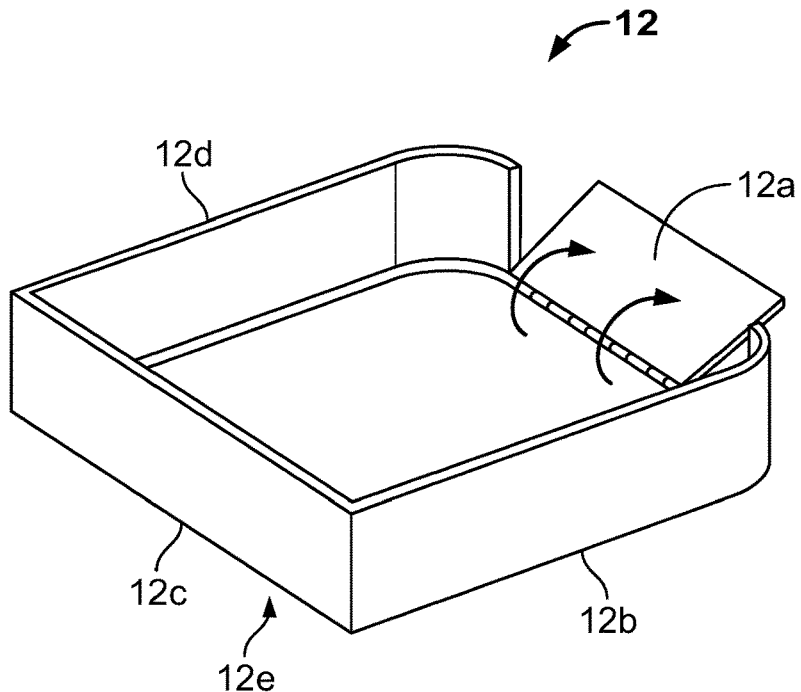
FIG. 5 illustrates a perspective view of a movable support element of housing of FIG. 3; wherein movable support is in intermediate position.
Figure 6:
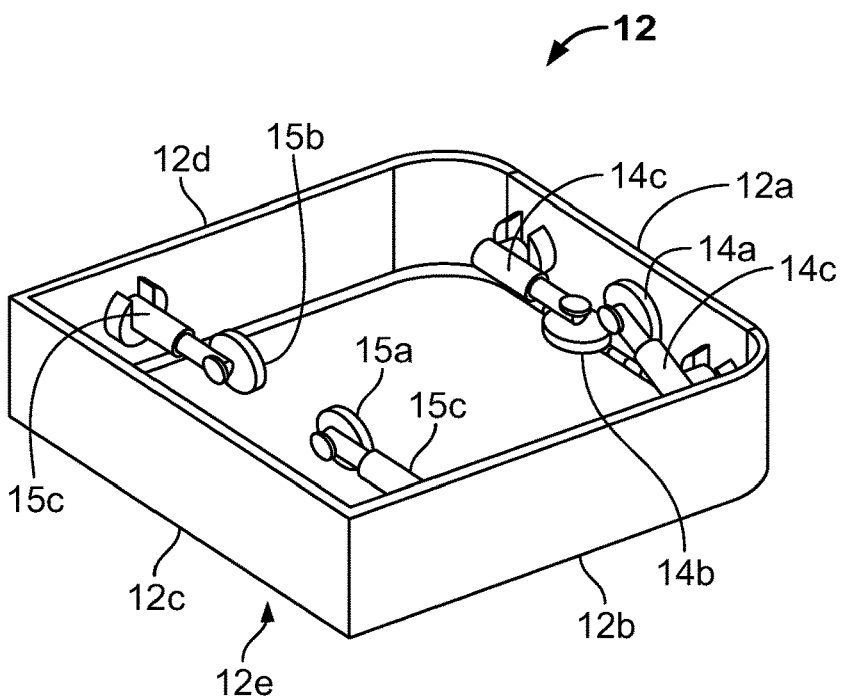
FIG. 6 is a perspective view of housing of FIG. 3, in which front and rear wheels are in retractable configuration.

Housing 12 is made of four walls 12a, 12b, 12c and 12d. A front wall 12a is movable between a closed configuration (as shown in FIG. 1 and FIG. 6) and an open configuration (as shown in FIG. 2, FIG. 3 and FIG. 4). Housing 12 has an operative top portion 12e and an operative bottom receptacle 12f formed by four walls 12a, 12b, 12c and 12d. Operative top portion 12e can be a flat surface or can be a receptacle. Operative top portion 12e receives seat portion 11a of safety seat 11 and seat portion 11a is securely clamped to operative top portion 12e by use of clamping elements such as bolts, nails, glue or other like clamping devices or combinations thereof to form an integral structure therebetween. Seat portion 11a can alternatively be pressed fitted in operative top portion 12e with or without need of additional clamping elements. Operative bottom receptacle 12f is configured to selectively accommodate at least a portion of converter mechanism, front wheels 14a, 14b and rear wheels 15a, 15b.

Converter mechanism is provided that easily and selectively converts safety seat 11 in a first configuration for use in a vehicle (as illustrated in FIG. 1) and a second configuration for use as a pushchair (as illustrated in FIG. 2).

To achieve the first configuration, front linkages 14c of converter mechanism are folded, either manually or automatically by use of a first switch (not illustrated in Figures) connected to linkages 14c. Folded front linkages 14c folds front wheels 14a, 14b such that front wheels 14a, 14b fit/seat within operative bottom receptacle 12f. Along with front wheels 14a, 14b, front wall 12a pivotally moves to the closed configuration thus enclosing housing 12. Folding of front wheels 14a, 14b thus enables safety seat 11 to be positioned directly on a seat of a vehicle.

Also, to achieve the first configuration, rear wheels 15a, 15b are also folded by folding second linkages 15c of converter mechanism either manually or automatically by use of a second switch (not illustrated in Figures) connected to second linkages 15c. Folded second linkages 15c folds rear wheels 15a, 15b such that rear wheels 15a, 15b fit/seat within operative bottom receptacle 12f.

To achieve the second configuration, first linkages 14c of converter mechanism are un-folded, either manually or automatically by first switch connected to first linkages 14c. Un-folded first linkages 14c un-folds front wheels 14a, 14b such that front wheels 14a, 14b projects out from operative bottom receptacle 12f and touches the ground. As the front wheels 14a, 14b projects out, front wall 12a pivotally move apart to achieve open configuration. Gravity assisted mechanism can also be used for un-folding of front wheels 14a, 14b and/or front wall 12a due to gravity. In open configuration of front wall 12a, front wall 12a acts as leg support to user.

Also, to achieve second configuration, second switch is actuated to actuate second linkages 15c of converter mechanism to be un-folded. Un-folding of second linkages 15c un-folds rear wheels 15a, 15b thus enables forming of pushchair.

In one embodiment, first linkages 14c and second linkages 15c can be connected with each other and operated by a switch, wherein switch is any one of first switch or second switch. First linkages 14c and second linkages 15c are separate linkages that are not connected with each other and operated by first switch and second switch respectively. Front wheels 14a, 14b and rear wheels 15a, 15b can be provided with wheel locking mechanism to lock wheels when desired.

Telescopic handle 16 is provided that achieves a retracted configuration when safety seat 11 is in first configuration for use in vehicle (as illustrated in FIG. 1) and achieves an extended configuration while safety seat 11 is in second configuration for use as pushchair (as illustrated in FIG. 2). Retracted configuration of telescopic handle 16 enables easy placement of safety seat 11 in vehicle. Extended configuration of telescopic handle 16 enables easy pushing of safety seat 11 for use as pushchair.

Light sources 17 are provided that illuminates the surrounding area, typically frontal area, of safety seat 11. This is advantageous feature as pusher can view the street/ground while pushing pushchair in dark. Also, when safety seat 11 is positioned in vehicle, light sources 17 can act as a projector to engage and entertain user while commuting. Light sources 17 can be LED lights and can be turned ON and OFF by using light switches (not illustrated in Figures). Light switches can be provided anywhere in the entire device.

In one embodiment, safety seat 11 can be additionally provided with at least one lifting handle (not illustrated in Figures) that enables lifting of safety seat 11 for placing and removing safety seat 11 in and out of vehicle. Lifting handle can be fitted on body of safety seat 11 or body of housing 12. Optionally, safety seat 11 can be provided with one or more other features like environment protector screen (not illustrated in Figures) that protects user from environment such as sun, rain and cold, storage area for storing user need, locking mechanism for locking safety seat 12 to a seat of vehicle and like other features.

The present disclosure discloses a method to convert safety seat 11 in the first configuration for use in vehicle from the second configuration as pushchair. Actuating first switch and second switch to actuate first linkages 14c and second linkages 15c respectively to fold front wheels 14a, 14b and rear wheels 15a, 15b respectively. Front wheels 14a, 14b and rear wheels 15a, 15b sits in operative bottom receptacle 12f of housing 12. Experience of jerk is prevented due to controlled movement of first linkages 14c and second linkages 15c. Along with front wheels 14a, 14b, front wall 12a is closed/gets closed to achieve the closed configuration of front wall 12a thus enclosing housing 12. Operative bottom portion of housing 12 becomes substantially flat when front wheels 14a, 14b and rear wheels 15a, 15b sits in operative bottom receptacle 12f. Telescopic handle 16 is retracted to for fitting within safety seat 11. Light sources 17 can be actuated or de-actuated as per the need. Safety seat 11 can then be lifted and positioned in vehicle.

The present disclosure discloses a method to convert safety seat 11 in the second configuration for use as pushchair from the first configuration for use in vehicle. Actuating first switch and second switch to actuate front linkages 14c and second linkages 15c respectively to un-fold front wheels 14a, 14b and rear wheels 15a, 15b respectively. Front wheels 14a, 14b and rear wheels 15a, 15b extends from operative bottom receptacle 12f of housing 12 and touches ground. Along with front wheels 14a, 14b, front wall 12a is lifted to achieve the open configuration of front wall 12a thus forming leg support for user. Telescopic handle 16 is extended to push safety seat 11. Light sources 17 can be actuated or de-actuated as per the need. Thus, pushchair is configured.

Material, size, shape of safety seat 11, housing 12, converter mechanism, front wheels 14a, 14b, rear wheels 15a, 15b, telescopic handle 16, and type of converter mechanism and light sources 17 can be varied and selected as per the desired cost, durability and reliability requirement of the invention as long as safety seat 11 can be easily converted from the first configuration to the second configuration and vice-versa.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A safety seat, comprising:
a seat portion mounted to a backrest portion, a wheel base assembly mounted under said seat portion, said wheel base assembly includes a retractable front wall having a rear face, a rear wall, and two side walls, thereby defining a perimeter having an interior space therein; said wheel base assembly includes a pair of first wheel members each mounted to one of said two side walls and extending away from said seat portion; a pair of second wheel members mounted to the rear face of said retractable front wall; a first switch is in communication with said pair of first wheel members and is configured to raise said pair of first wheel members within said interior space and said perimeter upon being actuated; a second switch is in communication with said pair of second wheel members and is configured to raise said pair of second wheel members within said interior space and said perimeter upon being actuated.

2. The safety seat of claim 1 wherein said seat portion includes at least one seat belt.

3. The safety seat of claim 2 wherein said seat portion includes two seat belts.

4. The safety seat of claim 1 wherein said backrest is movable from an upright position to a horizontal position configured for sleeping.

5. The safety seat of claim 1 wherein said wheel base assembly is mounted directly underneath said seat portion.

6. The safety seat of claim 1 wherein said first set of wheel members are mounted adjacent to said rear wall.

7. The safety seat of claim 1 wherein said first set of wheel members are mounted to said rear wall.

8. The safety seat of claim 1 wherein said first set of wheel members are mounted to said top wall.

9. The safety seat of claim 1 wherein said first set and said second set of wheel members include a shaft that connects said wheel members to said wheel base assembly or said retractable front wall.

10. The safety seat of claim 1 wherein said safety seat includes a pair of lateral wings extending from said back rest portion, each of said pair of lateral wings includes a top end and a bottom end, an illumination member mounted to said top end and said bottom end of each of said pair of lateral wings.

11. The safety seat of claim 1 wherein said pair of first wheel members are perpendicular to a ground surface upon being raised within said interior space and said perimeter; said pair of second wheel members includes one wheel member that is perpendicular with said ground surface when raised within said interior space and said perimeter, said pair of second wheel members includes a second wheel member that is parallel with said ground surface when raised within said interior space and said perimeter.

12. The safety seat in claim 1 wherein said back rest portion and said seat portion define an open space adapted to receive a child, said safety seat include two safety belts that extend entirely and horizontally across the open space thereby securing said child to said safety seat.

* * * * *